Nov. 24, 1936. E. H. CHABOT Re. 20,179

STRIP SERVING MECHANISM

Original Filed Oct. 12, 1925 5 Sheets-Sheet 1

Inventor;
Ephraim H. Chabot,
by Emery, Booth, Janney + Varney
Attys.

Nov. 24, 1936. E. H. CHABOT Re. 20,179

STRIP SERVING MECHANISM

Original Filed Oct. 12, 1925 5 Sheets-Sheet 2

Inventor:
Ephraim H. Chabot,
by Emery, Booth, Janney & Varney
Attys.

Nov. 24, 1936. E. H. CHABOT Re. 20,179

STRIP SERVING MECHANISM

Original Filed Oct. 12, 1925 5 Sheets-Sheet 3

Inventor;
Ephraim H. Chabot,
by Emery, Booth, Janney + Varney
Attys.

Nov. 24, 1936.

E. H. CHABOT

Re. 20,179

STRIP SERVING MECHANISM

Original Filed Oct. 12, 1925 5 Sheets-Sheet 4

Inventor;
Ephraim H. Chabot,
By Emery, Booth, Janney & Varney Attys.

Nov. 24, 1936. E. H. CHABOT Re. 20,179
STRIP SERVING MECHANISM
Original Filed Oct. 12, 1925 5 Sheets-Sheet 5
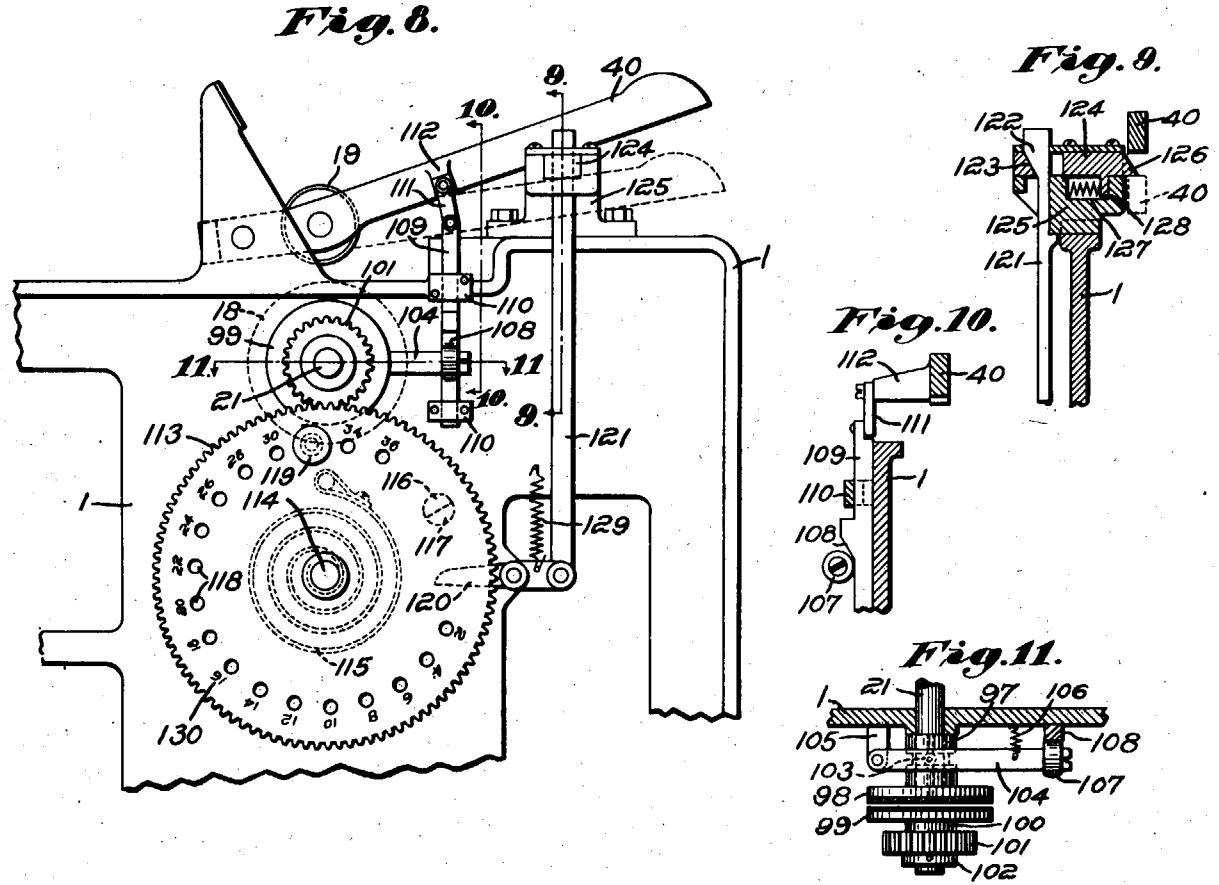
Inventor:
Ephraim H. Chabot,
by Emery, Booth, Janney & Varney
Attys.

Reissued Nov. 24, 1936

Re. 20,179

UNITED STATES PATENT OFFICE 20,179

STRIP SERVING MECHANISM

Ephraim H. Chabot, Nashua, N. H., assignor to Nashua Gummed & Coated Paper Company, Nashua, N. H., a corporation of Massachusetts Original No. 1,732,635, dated October 22, 1929, Serial No. 175,532, March 15, 1927, which is a division of application October 12, 1925, Serial No. 61,901. Application for reissue October 11, 1930, Serial No. 488,167

53 Claims. (Cl. 91—14.5)

This invention relates to mechanism for serving strip material and especially to adhesive strip servers utilizing moistening elements; more particularly it aims to provide improved means for feeding, moistening and cutting off from a supply readily and accurately controllable lengths of adhesive or gummed paper tape or the like, as for package sealing purposes. This application is a division of my copending application Serial No. 61,901, filed October 12, 1925, the claims of the present application being directed to all novel features and combinations of elements herein disclosed, excepting only the moistening element per se and as of general use, which latter is the invention of Trevor R. Gautier and is claimed in his copending application Serial No. 135,062, filed September 13, 1926, and in his related copending applications Serial Nos. 754,125 and 39,275, filed December 5, 1925, and June 24, 1925, respectively. Certain improved mechanism also within the broad scope of the present invention is disclosed and claimed in a copending application of T. R. Gautier and H. E. Nichols, Serial No. 258,875, filed March 3, 1928.

In the drawings, illustrating mechanism typifying my invention:—

Fig. 6 is a detail elevational view on a large scale of a portion of the strip severing mechanism, illustrating a position thereof intermediate that of Fig. 1 and Fig. 4;

Fig. 7 is a partial vertical section showing certain measuring or indicator means as viewed by the operator;

Figs. 8 to 11 show a modified form of mechanism, also embodying my invention, for positively measuring off or controlling the length of material to be fed and which may be employed in conjunction with or as a substitute for the strip length indicating mechanism shown in Figs. 1 to 7;

Fig. 8 is a side elevation of the forward upper portion of the machine viewed from the left;

Figure 1:
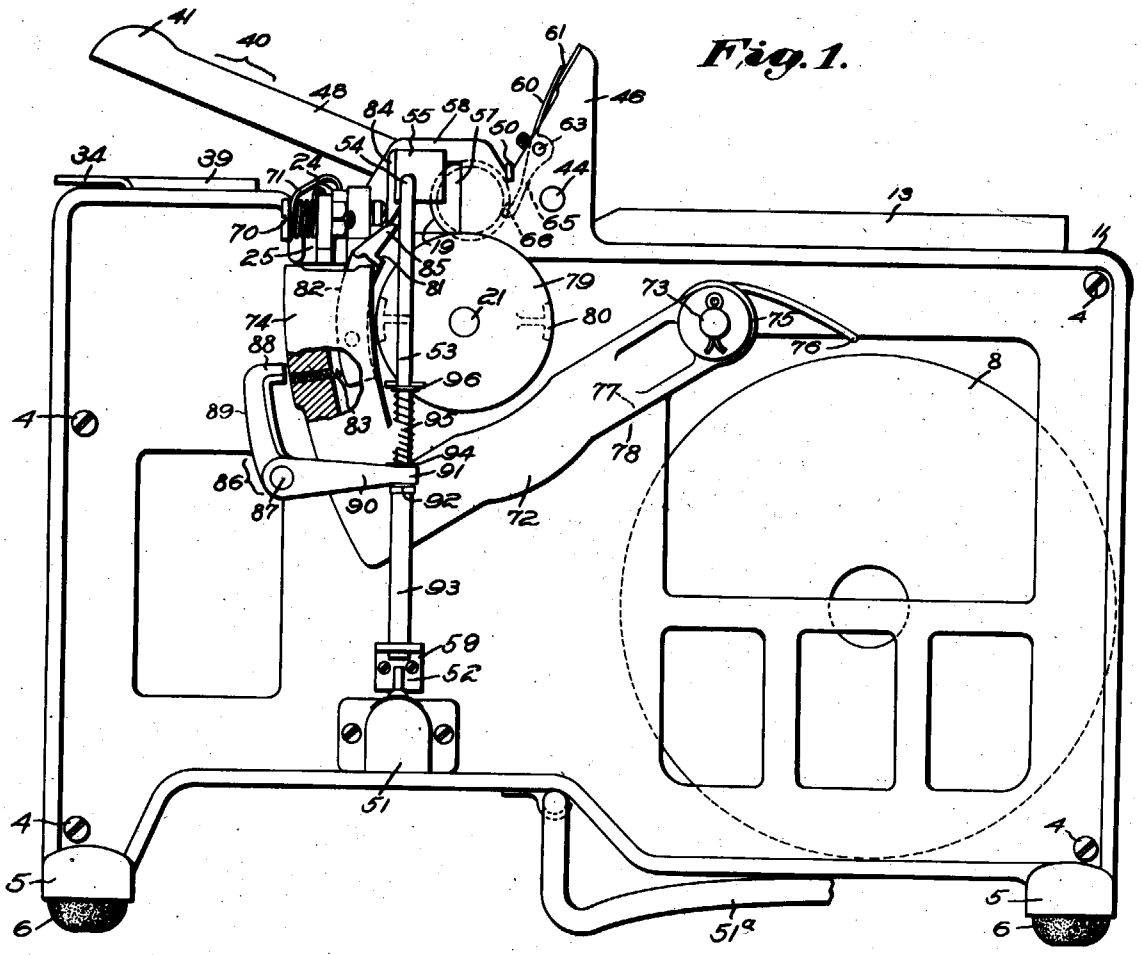
Fig. 1 is a side elevation of a machine embodying one form of my invention, the parts being in their normal or rest position.

Figs. 9, 10 and 11 are detail sectional views taken respectively upon the lines 9, 9, 10, 10 and 11, 11 of Fig. 8, looking in the direction of the arrows.

Referring more particularly to the drawings, the mechanism as a whole is mounted in a suitable housing or frame, herein including the side frames 1, 2 connected by tie rods 3, 3, etc., which may be removably held as by the screws 4, 4. Said frame is provided with an appropriate number of feet 5, 5, etc., preferably rubber shod, as indicated at 6, 6, etc.

Intermediate the side frames is a support for the supply of strip material 7 to be fed, illustrated as a roll 8 of gummed or adhesive tape. Said support herein consists of a metal sheet bent to form a floor 9, (see Fig. 3), on which the roll rests in position to be drawn upon, and an inner wall 10, the end edges of said sheet having portions engaging with two of the tie rods 3, 3, to hold it in place. The tape supply is set into its support, the tie rod at the lower rear portion of the roll support being so located as to prevent escape of the roll at the open rear of the machine. The feeding end of the tape is led upwardly over a roller 11 and along suitable guiding means upon the framing.

Figure 2:
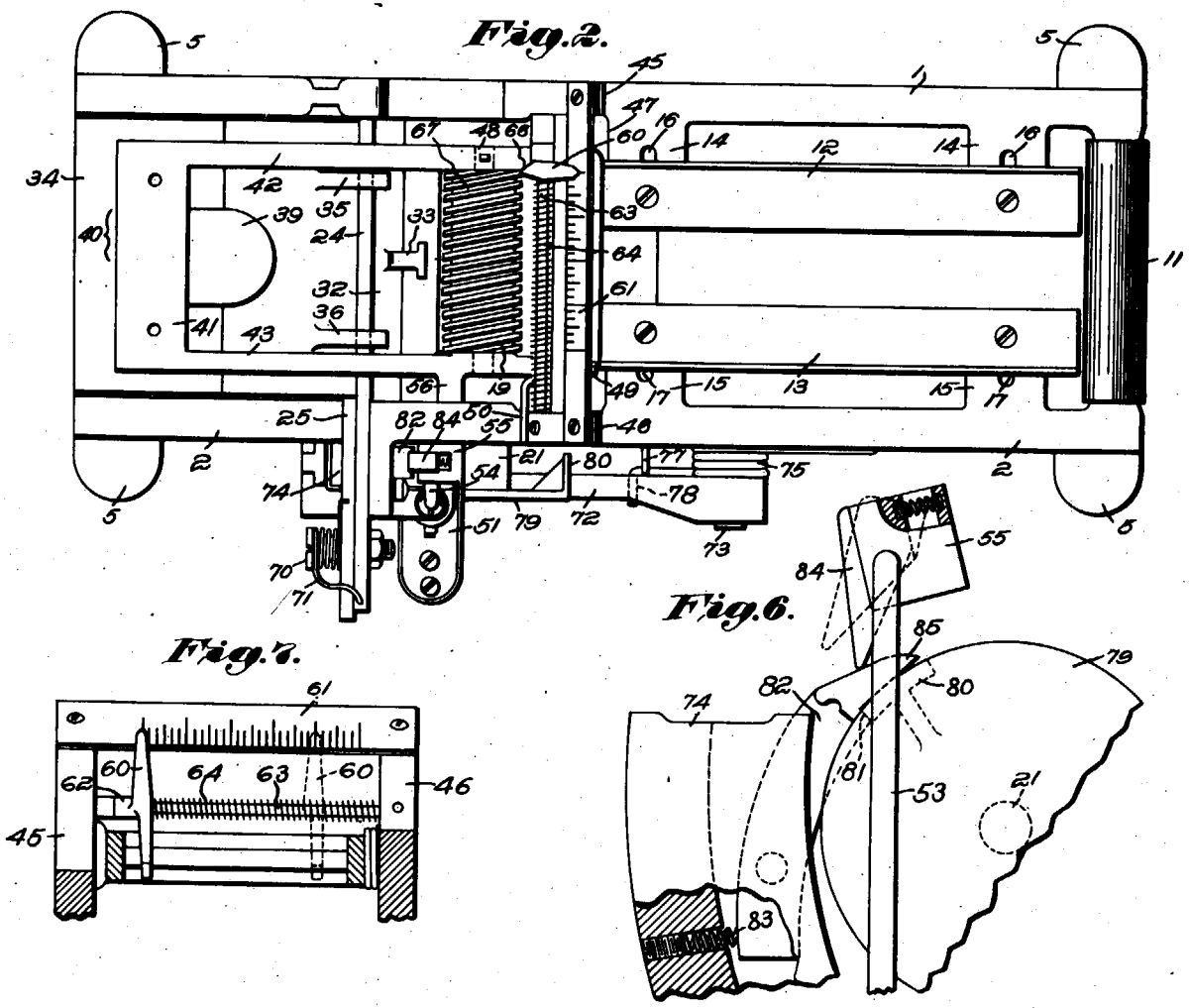
Fig. 2 is a plan view of the same.

Said strip guiding means includes a pair of guides 12, 13, of L-shape in cross-section, supported on the lugs 14, 14 and 15, 15 respectively (see Figs. 2 and 3), projecting inwardly from the adjacent side frames. The guides are secured to said lugs by the screw and slot connection indicated at 16, 17, Figs. 2 and 3, permitting them to be adjusted toward or away from each other to conform to the width of the particular tape employed. The forward ends of said guides are positioned to conduct the strip or tape with certainty to the feeding means.

Figure 3:
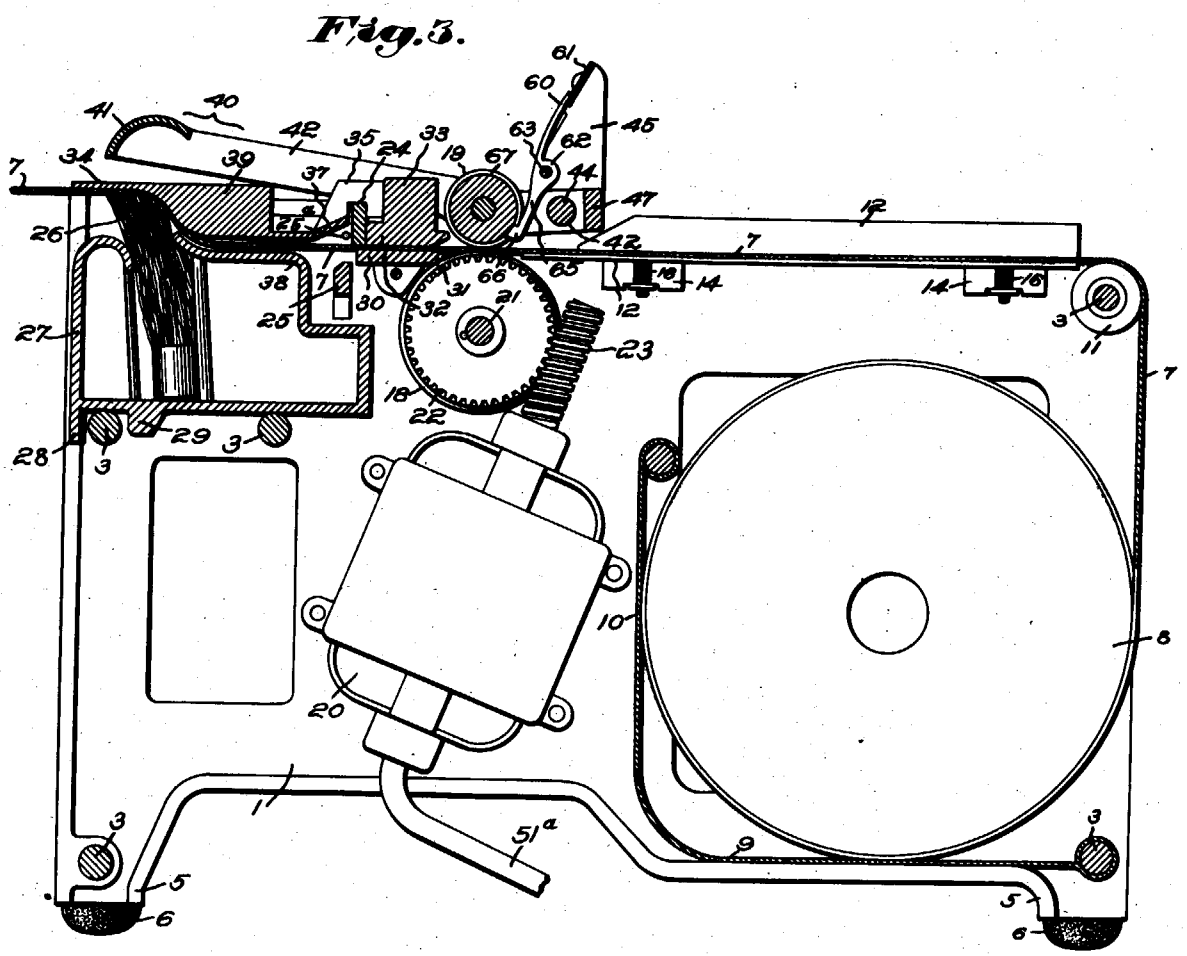
Fig. 3 is a vertical longitudinal section, taken substantially centrally through the machine of Figs. 1 and 2, but with the parts in the strip feeding position.

The feeding means comprises herein a pair of feed rolls 18 and 19 (see particularly Figs. 3 and 5), between which the tape passes directly from said guiding means. One of said rolls, herein the lower roll 18, is driven in this instance by power means illustrated as an electric motor 20, Fig. 3, forming a part of the machine assembly and supported intermediate the side frames 1, 2 in any suitable manner. As shown, said driven roll 18 is formed in two sections 18a, 18b, each fast upon a cross-shaft 21, see particularly Fig. 5, journalled in the side frames and projecting outwardly through one of them, herein that at the right of the operator facing the machine, seen at the left in Fig. 5. Between said sections 18[a], 18[b] is a worm gear 22 fixed upon said shaft or upon the hub of one of said sections. This gear meshes with a worm 23 formed on or directly connected to the rotor of the motor 20, as best seen in Fig. 3. The diameter of this gear is slightly less than that of the roll 18, so that the tape in passing over the latter does not come into contact with the gear.

Beyond or forwardly of the feeding means the tape is conducted by suitable guide devices into proper relation with the severing means, herein comprising the fixed blade 24 and a movable blade 25 and operating mechanism therefor hereinafter more fully described. Thence it is delivered past suitable moistening means illustrated as a brush 26, Fig. 3, inverted in a tank or reservoir 27. The latter is removably supported on adjacent tie-rods 3, 3, being held in proper position by ribs 28, 29 upon the bottom of the tank and between which one of said tie-rods is received. The moistening element per se and as adapted for general use, as previously stated, is the invention of Trevor R. Gautier and is so claimed in his application Serial No. 135,062 mentioned above.

Said guide devices forwardly of the feeding means include the plate 30, Fig. 3, extending between the side frames and having its rear edge adjacent the feed roll 18 formed as a stripper 31. This plate extends forwardly substantially to the severing blades, insuring passage of the tape between them. The tape is fed over the plate and beneath a removable weight 32 having an upwardly inclined rear lower edge, cooperating with the plate to facilitate guiding of the strip or tape. This weight rests freely upon the tape, holding it in the proper plane. It may be provided with a finger-piece 33 to facilitate its removal and insertion. Said weight or guiding member intermediate the tape feeding and severing means may be generally similar to that disclosed and claimed broadly in U. S. Letters Patent 1,568,506, dated January 5, 1926, Trevor R. Gautier, inventor.

After passing the severing means, the strip is properly guided in cooperative relation to the moistener. Herein, for the purpose stated, the upper wall of the reservoir 27 provides a guide surface over which the strip passes, between the same and a platen or presser plate 34, the forward portion of which rests upon the upper end of the brush 26, being removably held in position permitting it to yield away from the brush, as by means of the rearwardly projecting fingers 35, 36 recessed upon their lower edges so as to seat pivotally upon the upper edge of the fixed blade 24.

The lower surface of said presser plate at its rear end and the adjacent upper guide surface of the tank are oppositely inclined, as indicated at 37, 38 respectively, Fig. 3, to insure proper reception and guiding of the strip, and, at a point farther forward, these surfaces are formed to guide the strip accurately to and across the upwardly extending or moistening end of the brush. The presser plate is suitably weighted, as indicated at 39, to afford proper moistening contact of the tape and brush, but, as above stated, is readily yieldable upwardly or away from the brush to permit easy passage of the tape. It will be noted that this presser plate may with ease be removed bodily for cleaning or inspection purposes. The moistening tape is delivered from the moistener or moistening couple, including the brush and presser plate, conveniently to the hand of the operator or directly onto the object to which the tape is to be applied.

Referring again to the feeding means and its operating mechanism, the machine is so organized that the power means or motor 20 is in action only when the strip is to be fed. Moreover, one of the feed rolls, herein the upper and smaller roll 19, is movable toward and away from the other roll of the pair, and is brought into tape feeding relation with said other roll, herein the driven roll 18, only when the motor is started, preferably sufficiently subsequent to the starting of the motor to bring the operating load upon the motor only after it has attained the desired momentum. The instant that the required length of tape has been fed the motor is automatically shut off and the feeding relation of the rolls is broken.

Figure 4:
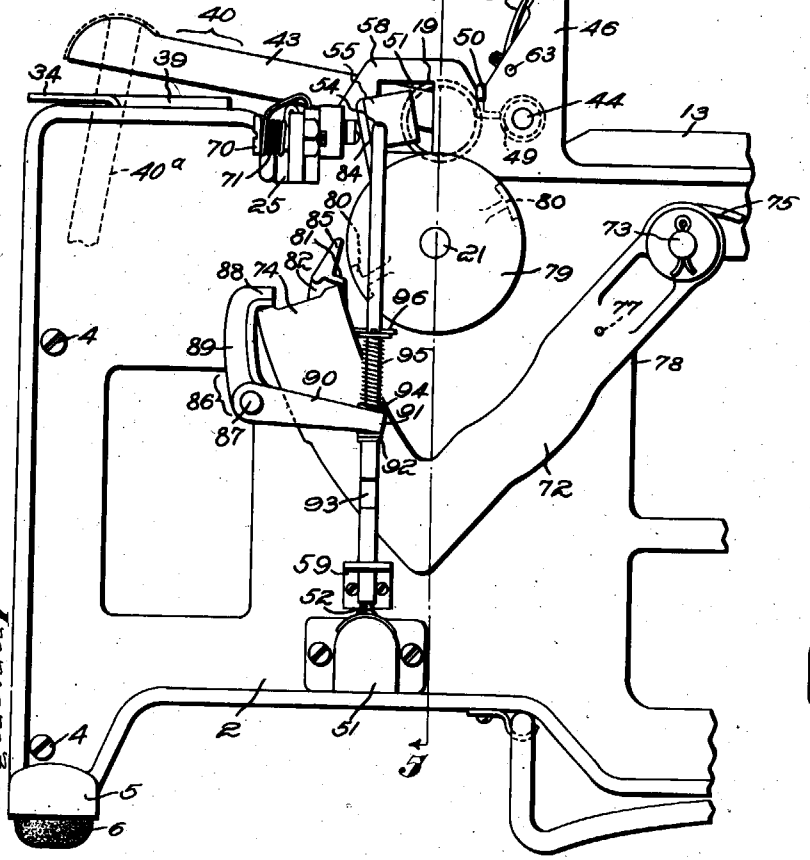
Fig. 4 is a side elevation of the forward portion of the machine, corresponding to a portion of Fig. 1 and showing the means for operating the strip severing mechanism in its preparatory or cocked position.

Operation of the machine is controlled by the operating element or control lever indicated as a whole at 40, seen in its normal or up position in Fig. 1, in which the parts are at rest, and in its operating or depressed position in Figs. 3 and 4. This element is formed as a yoke-shaped member having at its forward end a cross piece 41 for engagement by the hand of the operator, and from which extend the arms 42, 43 fast upon a pivot pin 44 journalled in brackets 45, 46 extending upwardly from the respective side frames 1, 2. The rear ends of said arms are at a slight angle to the remaining portions and are interconnected by a bar 47. If desired, said operating element may be foot-controlled by a pedal connected to said element, as by the removable rod 40[a] seen in dotted lines in Fig. 4.

The upper feed roll 19 is carried by said control lever, being rotatable on a shaft 48 supported at its ends in the arms 42, 43 of said control lever. The latter, with the roll 19, is normally maintained in raised position, as in Fig. 1, as by the coil spring 49 surrounding the pivot pin 44 and bearing at one end against the side frame 2, as indicated at 40, Figs. 1 and 4, and at its other end engaged in or beneath the control lever at a point forward of the pivot pin 44 of the latter.

The control lever or operating member herein also controls, through suitable connections, the motor switch 51, Figs. 1, 2, 4 and 5, supported on and side frame 2. Current is supplied from any suitable source by the conductor 51[a], said switch being placed in the circuit with the motor. The spring-lifted switch lever or circuit-closing element 52 of the switch is positioned to be actuated by the lower end of a rod 53 connected at its upper end 54 to a block 55 at the outer end of a lug 56 projecting from the adjacent arm 43 of the control lever, the bracket 46 being provided with an opening 57 through which said lug extends. In the inoperative or normal position of the control lever this lug brings up against the overlying portion 58 of said bracket, thus limiting its upward movement.

Figure 5:
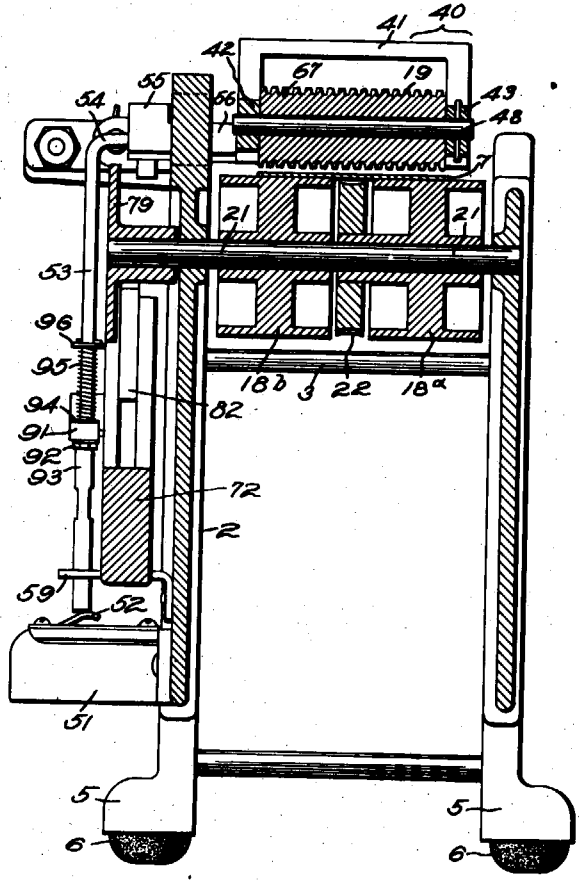
Fig. 5 is a vertical, transverse section on the line 5—5 of Fig. 4.

As the control lever is depressed the rod 53, guided at its lower end in the bearing 59 on the side frame 2, is carried down into engagement with the circuit closer 52, depressing the same, as seen in Fig. 4, and starting the motor. Subsequent release of the control lever permits its spring 49 to raise the lever and rod, allowing the circuit closer to return to open position, as in Fig. 1. The construction and arrangement of the parts is preferably such that the switch is closed and the motor started before the upper roll 19 has been brought into tape feeding relation with the lower roll 18. This incompletely depressed position of the control lever and upper roll is illustrated in Fig. 5. A slight further depression of the control lever beyond that shown in said figure, however, will cause said upper roll to approach the cooperating lower and driven roll sufficiently to engage and feed the tape between them, as in Fig. 3.

It will thus be seen that the feed rolls and the motor for driving them normally remain at rest, and are operated only during such periods as the control lever is held depressed by the operator. As soon as the desired length of tape has been fed, release of the control lever will instantly stop the motor, bring the feed rolls to rest, and carry them out of tape feeding relation. This results in a great saving of power, as well as wear of the parts, since the motor and other driven parts remain stationary at all times when not actually required to be in operation for feeding tape.

To enable the operator accurately and positively to determine and control the length of tape served, I have herein provided indicating or measuring means positioned so as to be at all times readily observable by the operator and effective to show the precise length of tape which has been fed.

Referring particularly to Figs. 3 and 7, said indicating means herein comprises a pointer 60 which is movable along a scale or dial 61 graduated in units of tape length and supported by the brackets 45, 46, so as to lie in a plane substantially at right angles to the line of sight of the operator.

Said pointer is provided with a bearing or collar 62 slidable upon a rod 63 parallel with said scale. It is normally forced to and held at the zero end of the scale as by the coil spring 64 surrounding said rod and bearing intermediate said collar and the inner face of the opposite bracket 46. Depending from this collar is a finger 65 having at its free end a nib 66 adapted to be engaged in a spiral groove 67 formed in the surface of the upper feed roll 19. As this feed roll is rotated during feeding of the tape, said finger, collar and attached pointer are caused by said spiral to traverse lengthwise the rod 63 and scale 61 at a rate and to an extent exactly proportionate to the surface speed of the roll and accordingly also to the length of tape fed.

Normally, in its raised position, the roll is out of engagement with the nib 66 of the pointer finger. As the control lever is depressed to start the feeding mechanism, engagement of said nib with a spiral groove 67 of the roller is effected, as clearly seen in Fig. 3. Preferably this spiral grooving is double and of relatively large pitch, insuring that a portion thereof will always lie opposite said nib in position to engage the same, whereby the pointer or indicator is always caused to start its traverse substantially simultaneously with the feeding of the tape, avoiding any inaccuracy which might arise with the use of a single spiral, even of less pitch.

This spiral grooving is carried out to the extreme end of the roll adjacent the high-reading end of the scale, or has its floor at the end of the groove inclined up to the surface of the roll, so that if it is desired to feed and measure a length of tape greater than one complete scale reading, the nib 66 rides out at the end of the groove, permitting the finger and pointer to be snapped back to the zero end of the scale by the spring 64, where it will immediately begin a second reading or indication. Thus any desired length of tape may be fed and measured merely by continuing the operation of the feeding means, the indicator repeating its full reading any successive plurality of times or one or more times plus any fraction of a full reading. The length of the scale and proportions of the indicator operating parts, however, are desirably such that the maximum length of tape required under usual conditions will be shown by one reading of the scale, or less.

When the pointer indicates that the desired length has been fed, for example, in the dotted line position of the pointer shown in Fig. 7, release of the control lever will instantly stop the feed, and also effect severance of the length desired, in a manner to be described. Said release of the control lever, as previously noted, causes the spirally grooved roll to be disengaged from the pointer nib 66, permitting the pointer to return, under influence of its spring 64, to position again to start indicating when the next portion of tape is fed.

As above stated, the tape is automatically severed when the desired length has been supplied. Severance is effected by the cooperating fixed and movable blades or knives 24 and 25 already mentioned. The movable blade 25 is pivotally supported at 70 for movement across the service path of the tape. It is normally depressed below said path by its own weight, assisted by a coil spring 71 surrounding the blade pivot and having its opposite ends engaged with the respective blades in a manner tending to swing the movable blade away from and herein below the fixed blade. Upward movement of said blade may be limited by any suitable stop means, such as the abutment 25a, Fig. 3.

For operating the severing means I provide a blade-actuating element, hammer, or trip-arm 72 pivoted at 73 upon the side frame 2 and having a head 74 adapted to be brought up into engagement with the blade 25, moving the same to sever the tape against the fixed blade 24. Surrounding the pivot 73 of said trip-arm is a heavy coil spring 75 having one end engaged with the side frame 2, as at 76, Fig. 1, and its other end extended beneath a stop 77, see Fig. 2, on the side frame. The last mentioned end of this spring also has a laterally offset portion 78 upon which the lower edge of the trip-arm rests, in its normal position shown in Figs. 1 and 2. By means of the stop 77 the pressure of the spring tending to raise the trip-arm is relieved from the latter at a time prior to the completion of its blade-actuating throw, said arm and the movable blade 25 completing their actuating movement under their momentum and then returning to the extent necessary to bring the blade to its normal position clear of and herein below the service path of the tape, thus removing any possibility of jamming of the tape during the first part of the next feeding operation.

Prior to severance of the tape, the trip-arm receives a preparatory or cocking movement, herein downwardly, against the pressure of its spring 75. Suitable means is provided for effecting this cocking action. For this purpose the outer end of the lower feed roll shaft 21 has fixed to it a plate 79 carrying one or more lugs 80, 80 adapted to engage a shoulder 81 on a pivoted finger 82 mounted in the head 74 of the trip-arm. Normally the shoulder 81 is held out of the path of said lugs, as by the spring 83 in trip-arm head, as shown in Fig. 1 and again in Fig. 4.

The block 55 connected to the control lever 40 carries a pivoted, spring-pressed dog 84 which, during the first part of the downward movement of said control lever, engages the upper face of a nose 85 on said trip-arm finger 82, see particularly Fig. 6, thereby moving the latter rearwardly sufficiently to bring its shoulder 81 into the path of one of the lugs 80. At substantially the same time, the motor 20 has been started, turning the plate 79 carrying these lugs, effecting the engagement of one of them with the shoulder 81, as well shown in said Fig. 6, and thereby causing the trip-arm to be carried down into cocked position. The dog 84, being pivoted and spring-pressed, may yield forwardly, to the left in Figs. 1 and 6, sufficiently to avoid interference with said movement of the trip-arm and its finger, as indicated by the dotted line position of said dog in Fig. 6. As shown, said dog 84 is pivotally supported upon the inwardly bent end of the rod 53.

Just prior to the time at which the active lug 80 would ride off from the shoulder 81 in the continued turning of the plate 79, the trip-arm is caught and held down by a latch 86, formed as a bell-crank pivoted at 87 upon the side frame 2. This latch has projection 88 on one arm 89 of the bell crank adapted to hook over the trip-arm, in the manner seen in Fig. 4, retaining the same in cocked position so long as the control lever is depressed and the machine in operation to feed tape. The other arm 90 of the bell-crank is formed at its free end with a collar 91 through which the rod 53 extends loosely. Said rod is preferably formed in two parts threaded onto each other at their adjacent ends, as indicated at 92, Figs. 1 and 4, permitting the over-all length of the rod to be adjusted to time the actuation of the circuit closer 52 previously described. The collar 91 of the latch 86 lies between the upper end of the lower portion 93 of the rod 53 and a washer 94, against which bears one end of a coil spring 95, surrounding the upper portion of the rod 53. The other end of this spring rests against a stop 96 on said rod.

Normally, and as shown in Fig. 1, the spring 95 is not under tension, and the projection 88 of the latch is out of the path of the trip-arm. As the control lever is depressed, however, together with the rod 53, the stop 96 on the latter has a movement relative to the collar 91 of the latch, first compressing the spring 95 and then causing the latch to be swung over into engaging position, as in Fig. 5. When the control lever is subsequently released, the desired length of tape having been fed, it is immediately raised by its spring 49, carrying the rod 53 up with it and throwing the latch back to release or trip the hammer or trip-arm 72. The latter, under the influence of its spring 75, flies up against the movable blade 25, causing it to sever the tape.

Owing to the provision of the pressure-relieving stop 77 for the spring 75, the trip-arm immediately drops back sufficiently in the direction of its cocking movement, until it seats on the portion 78 of said spring, to allow the movable blade again to clear the path of the tape and to return to its normal or rest position below said path. A tape-severing blade actuating member similarly arranged for movement relative to its spring at the end of its blade-actuating throw, by means of a spring-pressure-relieving stop permitting the blade to move clear of the service path of the tape after the severing operation, is disclosed and claimed broadly in the patent to Trevor R. Gautier above mentioned.

In Figs. 8 to 11 I have shown a modified form of means for measuring or controlling the exact length of strip material fed and which may be employed in conjunction with or as a substitute for the indicator means above described. Referring to said figures, parts not specifically referred to may be the same as in figures previously described, including the relatively separable feed rolls, the means relatively to move them into feeding relation and to enable variation of their period of strip feeding relation, the means to separate them, and the means thereafter to sever the tape. In Figures 8 to 11, the shaft 21 of the driven roll 18 is extended outwardly through the side frame 1 at the left of the machine. A sleeve 97 is slidably keyed to the projecting portion of this shaft, see particularly Fig. 11. Secured to the outer end of said sleeve is one element 98 of a clutch, the cooperating element 99 of which is carried by the hub 100 of a pinion 101 loose on said shaft and held in position as by the collar 102 pinned to the shaft.

The clutch is arranged for actuation upon starting of the machine, herein by suitable connections with the manual control lever 40. Accordingly the slidable sleeve 97 is formed with a circumferential groove receiving a roll 103 on a yoke-like piece 104 pivoted at one end upon a lug 105 on the adjacent side frame 1. The yoke-piece is normally drawn toward the frame, as by the spring 106, holding the clutch disengaged. At its free end said yoke-piece carries a roll 107 adapted to be engaged by a cam 108, see also Fig. 10, on a vertical slide-bar 109 mounted in suitable guides 110 on the side frame. The upper end of this slide-bar is operatively connected through a pivoted link 111 to a lateral projection 112 on the control lever 40. When the latter is depressed to start the machine the slide-bar will therefore be moved down, bringing said cam 108 into engagement with the roll 109 and causing the yoke-piece 104 to engage the shiftable clutch element 98 with its cooperating element 99, thus drivingly connecting the shaft 21 to the pinion 101.

Meshing with said pinion is a relatively large, circumferentially toothed disc or gear 113 loose upon a stud 114 carried by the side frame, the gear being held in position on said stud by a suitable collar. A spiral spring 115 secured at one end to the gear and at its opposite or inner end to said stud 114 tends to turn the gear in a clockwise direction, viewing Fig. 8, and is mounted under sufficient tension to hold the stop 116 upon the inner face of said gear in engagement with a cooperating stop 117 projecting from the side frame of the machine. As shown, these stops 116 and 117 are respectively formed as mating halves of a split pin.

The disc or gear 113 is provided with adjustable means adapted to engage with suitable mechanism, to be described, automatically to delimit the operating period of the feeding means and to effect stoppage of the feeding action of the machine at any desired and predeterminable time. As illustrated, a circumferential series of holes 118 is formed in this gear, each adapted to receive a pin 119. Upon starting of the machine this gear 113, then in its normal or zero position with the stop 116 abutting the cooperating stop 117, is turned in a counterclockwise direction by the driven pinion 101. The gear is thus turned until the pin comes into engagement with one end of a finger 120 projecting into its path and pivotally mounted upon the side frame. At the opposite end of said finger there is pivotally attached the lower end of a control lever release rod 121, see also Fig. 9, having near its upper end a cam 122 in engagement with a like formation 123 upon a spring-pressed latch 124 mounted for sliding movement toward and away from the control lever in a bracket 125 secured to the machine frame.

Said latch has a nose 126 adapted to override the control lever 40 when the latter is depressed into the dotted line position shown in Fig. 9, and to hold the same in said position, the latch being yieldably projected inwardly by its spring 127 mounted in the bracket 125 and bearing against a downward projection 128 upon the latch. A suitable spring 129, see Fig. 8, fastened at one end to the side frame 1 and at its other end to the outer portion of the finger 120 normally holds the release rod 121 in its upward position, shown in Fig. 9, wherein its cam 122 is sufficiently raised to permit the desired inward movement of the latch by its spring.

When the adjustable pin 119 of the gear 113 has traveled around into engagement with the finger 120 in its path, engagement of the same with said finger will lift the inner end of the latter, causing the release rod 121 to be drawn down against its spring 129. This cams the latch 124 outwardly, by engagement of the cam parts 122 and 123, and releases the control lever for return to its normal or raised position by its own spring, as in the figures previously described. This raising or return movement of the control lever likewise lifts the slide bar 109, removing its cam 108 from engagement with the roll 107, whereupon the clutch elements are separated by the action of the spring 106. The pinion 101 is thus left free to turn reversely, and the larger gear 113 meshing with it is returned in a clockwise direction to its normal or zero position, by action of its spring 115.

The pin may be positioned upon the gear to delimit the feeding action as desired, thus to effect service of any required and predetermined positive length of tape. Preferably an index 130 or like strip-length indicating means is provided in connection with the means for delimiting the operating period of the feeding means, graduated in units of length of strip. With the parts arranged as shown, by way of example, the length of feed may be varied by intervals, illustrated as two inches, from a minimum, for instance, of two inches, up to thirty-six inches, simply by varying the location of the pin 119, the length of feed being determined by the angular travel of the gear 113 from its zero position to the point at which the adjustable pin engages the finger 120 and operates the release rod. Obviously the parts may be proportioned or arranged to afford any desired maximum and minimum lengths of feed, or variations by intervals of any desired extent. Also, the adjustable pin means is typical of stop means adjustable in the path of the feed delimiting means, such stop means including variable length cams and the like equivalents.

With the mechanism shown in Figs. 8 to 11, the hand of the operator is left free during the strip feeding operation, the control lever being automatically held down and automatically released at the proper time to give the predetermined length of strip. With either form of mechanism illustrated it will be seen that the feeding means is operable by the user to feed a predetermined length of the unsevered forward end of the strip to and past the moistener, thus positively to present a predeterminable unapplied length of strip to the user, whereby predetermined and variable, positive lengths may be fed at will under the control of the operator. The construction and arrangement of the parts assures positive action, and prevents deflection of the body of the strip from the true service path, as well as obviating any reverse pull by the strip roll or supply.

My invention is not limited to the particular forms thereof shown and described herein, its scope being set forth in the appended claims.

I claim:

1. In mechanism for serving strips of adhesive tape or the like, a support for a tape supply, means for feeding from said supply a length of tape, a motor for actuating said feeding means, tape severing means, spring means for effecting the severing operation of the latter, means whereby said motor sets said tape severing means for actuation by said spring means, an element controllable by the operator for starting and stopping said motor, and means whereby movement of said element to motor stopping position effects actuation of said tape severing means.

2. In strip serving mechanism, a support for a strip supply, strip feeding means, a motor operatively connected with the latter, a member movable across the path of the strip to sever the same, spring means to effect said strip severing movement of said member, means actuated by said motor to tension said spring means, and means having a common control to start and stop said motor and to release said tensioned spring means for strip severance.

3. In strip serving mechanism, a support for a strip supply, strip feeding means, a motor operatively connected with the latter, a member swingable across the path of the strip to sever the same, spring means to effect said strip severing movement of said member, other means to insure the opposite return movement of the latter, and means actuated by said motor to tension said spring means.

4. In strip serving mechanism, a support for a strip supply, strip feeding means, a motor operatively connected with the latter, a member movable across the path of the strip to sever the same, spring means to effect said strip severing movement of said member, means actuated by said motor to tension said spring means, holding means to retain said spring means in tensioned position, a switch for said motor, a spring-returned member for throwing said switch to start the motor, and means whereby release of said spring-returned member releases said tensioned spring means to sever the strip, said strip feeding means including a pair of rolls relatively movable into and out of strip feeding relation by the movement of said spring-returned member.

5. In strip serving mechanism, a support for a strip supply, strip feeding means, a motor operatively connected with the latter, a member movable across the path of the strip to sever the same, spring means to effect said strip severing movement of said member, means actuated by said motor to tension said spring means, holding means to retain said spring means in tensioned position, a switch for said motor, a spring-returned member for throwing said switch to start the motor, and means whereby release of said spring-returned member releases said tensioned spring means to sever the strip.

6. In a strip serving machine, a support for a strip supply, strip feeding means, a motor to actuate the latter, the strip severing means including a blade movable across the path of the strip, a member engageable with said blade to effect said movement, spring means to cause said engagement, means actuated by said motor to cock said member against the tension of said spring, a control element normally spring-retained in "off" position and adapted to start said motor when moved against the pressure of its spring, and connections whereby subsequent release of said element releases said cocked member for engagement with said blade thereby to sever the strip.

7. In a strip serving machine, a support for a strip supply, strip feeding means, a motor to actuate the latter, strip severing means including a blade movable across the path of the strip, a member engageable with said blade to effect said movement, spring means to cause said engagement, and means actuated by said motor to cock said member against the tension of said spring for actuation thereby in the opposite direction.

8. In a strip serving machine, a support for a strip supply, strip feeding means, a motor to actuate the latter, strip severing means, an operating member therefor having a preparatory movement and an opposite operating movement, and connections whereby said motor effects the preparatory movement of said member.

9. In a strip serving machine, a support for a strip supply, strip feeding means, a motor to actuate the latter, strip severing means including a blade movable across the path of the strip, a member having a preparatory movement and an opposite blade-actuating movement, connections whereby said motor effects the preparatory movement of said member, spring means to produce said blade-actuating movement, and mechanism to retain said member at the end of its preparatory movement and to release the same when the desired length of strip material has been fed.

10. In a strip serving machine, a support for a strip supply, a pair of rolls between which the strip is adapted to be fed, a motor and connections for driving one of said rolls, a control lever, spring means normally retaining said lever in "off" position, the other of said rolls being rotatably carried by said lever for movement into or out of feeding relation to said driven roll, and means whereby said control lever in moving said roll into feeding relation effects the starting of said motor, said spring means acting to return said control lever to its normal position when released and thereby stopping the motor and removing said roll from feeding relation.

11. In a strip serving machine, a support for a strip supply, a pair of rolls between which the strip is adapted to be fed, a motor and connections for driving one of said rolls, a control lever, spring means normally retaining said lever in "off" position, the other of said rolls being rotatably carried by said lever for movement into or out of feeding relation to said driven roll, and means whereby said control lever in moving said roll into feeding relation effects the starting of said motor.

12. In a strip serving machine, a support for a strip supply, a pair of rolls for feeding the strip, a motor for driving one of said rolls, the other roll being movable into and out of feeding relation with said driven roll, and common means to start said motor and to move said roll into feeding relation.

13. In a strip serving machine, a support for a supply of strip material, means to feed the same, an electric motor on said machine for operating said feeding means, a control switch therefor, a feed control lever having a normal inactive position from which it is movable by the operator to actuate said control switch, and means for returning said lever to its normal position when released by the operator, with resultant stopping of the feeding operation.

14. In a strip serving machine for labelling, package sealing and the like, a support for a strip supply, strip feeding means, a motor to actuate the latter, strip severing means, and spring-returned manual means to start the motor and, upon release after the feeding of the desired length of strip material, to stop said motor and effect actuation of said severing means.

15. In a strip serving machine for labelling, package sealing and the like, a support for a strip supply, roll means for feeding the strip, said roll means having a normally inoperative position and an operative position, a motor to drive said feeding means, direct gearing connections between said motor and feeding means, including a worm on the rotor element of said motor meshing with a worm gear coaxial with a roll of said feeding means, and lever means manually operable at the will of the operator to determine the operative or inoperative positioning of said roll means, thereby to control the operating periods thereof.

16. In a strip serving machine, a support for a strip supply, a pair of rolls for feeding the strip, a motor for driving one of said rolls, means to start the motor, the other roll being movable into and out of feeding relation with said driven roll and means connected with said motor starting means to move said roll into feeding position.

17. In a strip serving machine, a support for a strip supply, a pair of rolls for feeding the strip, a motor for driving one of said rolls, means to start the motor, the other roll being movable into and out of feeding relation with said driven roll, and means to bring said rolls into proper feeding relation only after the motor has been started.

18. In a strip serving machine, a support for a strip supply, a pair of rolls for feeding the strip, a motor for driving one of said rolls, means for starting and stopping the motor, the other roll being movable into and out of feeding relation with said driven roll, and means connected with said motor starting means to move said roll into feeding position and to return said roll upon stopping of the motor at the end of the feeding operation.

19. In a strip serving machine, a support for a strip supply, a pair of rolls for feeding the strip, a motor for driving one of said rolls, the other roll being movable into and out of feeding relation with said driven roll, and means to bring said rolls into proper feeding relation only after the motor has been started and to break said relation upon stopping of the motor at the completion of the feeding operation.

20. In a strip serving machine, a support for a strip supply, means to feed the strip from said supply, severing means including a blade movable across the service path of the strip and having a normal position clear of the same, a spring-pressed member movable in one direction to operate said blade, power-operated means to move said member in the opposite direction to tension the same, means to release said member upon completion of the feeding operation, and means permitting said member to return sufficiently in said opposite direction subsequent to its blade-operating movement to enable the blade to assume its normal position clear of the path of the tape.

21. In a strip serving machine, a support for a strip supply, means to feed the strip from said supply, severing means including a blade movable across the service path of the strip, a spring actuated member adapted to contact and move said blade to cause it to sever the strip, power-operated means to cock said member, and means to release said member for severing actuation by its spring when the desired length of strip material has been fed.

22. In a strip serving machine, a support for a strip supply, means to feed the strip from said supply, severing means including a blade movable across the service path of the strip, a motor operatively connected to said feeding means, means adapted for manual operation to control the starting and stopping of said motor, a spring-actuated member for moving said blade, and mechanism operated by said motor to cock said member, said means adapted for manual operation effecting the release of said member for actuation by its spring thereby to sever the strip.

23. In a strip serving mechanism, a support for a strip supply, roll means to feed the strip, a motor for driving the same, a control lever having a normal raised position and depressible to start the motor, a strip severing blade, means to operate the same to sever the strip, and means whereby the return of said lever to its normal position effects actuation of said operating means.

24. In a strip serving mechanism, a support for a strip supply, roll means to feed the strip, a motor for driving the same, a control lever having a normal raised position and depressible to start the motor, a strip severing blade, a spring-pressed arm for operating said blade, mechanism actuated by said motor for moving said arm against the pressure of its spring, latch means engageable with said arm to hold it when so moved, and means whereby the return of said control lever to raised position releases said latch means to permit operation of said blade by said arm.

25. In a strip serving mechanism, a support for a strip supply, roll means to feed the strip, a motor for driving the same, a control lever having a normal raised position and depressible to start the motor, a strip severing blade, a spring-pressed arm for operating said blade, means actuated by said motor and adapted to engage said arm to cock the same, said control lever having a portion to effect said engagement when depressed to start the motor, and a latch automatically engageable with said arm to hold it cocked and releasable by the return of said control lever to its raised position.

26. In mechanism for serving strips of adhesive tape or the like, a support for a tape supply, a plurality of rolls for feeding successive lengths of tape from said supply, means to rotate said rolls, and means movable in synchronism with one of said rolls to measure and indicate the length fed, said last-named means constructed and arranged automatically to start its indication at the same indicating point for successive tape lengths.

27. In mechanism for serving strips of adhesive tape or the like, a support for a tape supply, a plurality of rolls for feeding the tape from said supply, means to rotate said rolls, and tape measuring means actuated by one of said rolls to indicate the length fed, said means including a scale, a pointer movable along the same, connections between said pointer and one of said rolls whereby the pointer is moved proportionately to the surface travel of said roll, and means automatically to return said pointer to its starting position after the feeding of each tape strip.

28. In mechanism for serving strips of adhesive tape or the like, a support for a tape supply, a plurality of rolls for feeding the tape from said supply, means to rotate said rolls, an index element movable lengthwise said rolls and having a normal or starting position and connections between said roll rotating means and said index element to move the same in proportion to the length of tape fed and to effect its return to said normal or starting position at the end of each feeding operation.

29. In mechanism for serving strips of adhesive tape or the like, a support for a tape supply, a plurality of rolls for feeding the tape from said supply, means to rotate said rolls, an index element, a support whereon said element is movable, a spiral formation on one of said rolls, and connections between said formation and element whereby rotation of the roll produces a proportionate travel of said index element.

30. In mechanism for serving strips of adhesive tape or the like, a support for a tape supply, a plurality of rolls for feeding the tape from said supply, means to rotate said rolls, a movable index element, connections between one of said rolls and said index element to move the same in proportion to the length of tape fed, and means to return said element to its initial position upon completion of the feeding operation.

31. In mechanism for serving strips of adhesive tape or the like, a support for a tape supply, a plurality of rolls for feeding the tape from said supply, means to rotate said rolls, an index element, a support whereon said element is movable, a spiral formation on one of said rolls, and connections between said formation and element whereby rotation of the roll produces a proportionate travel of said index element, said element and operating connections being constructed and arranged to permit successive repeat movements of said element when the length of tape fed exceeds the maximum indicated by one full movement thereof.

32. In a strip serving machine, a support for a strip supply, feed rolls, means to drive the same, a lever to control said driving means, a movable index element to measure and indicate the length of strip fed, and means whereby movement of said control lever effects operative engagement between said index element and a driven part.

33. In a strip serving machine, a support for a strip supply, a pair of feed rolls, a motor to drive one of said rolls, the other roll being movable into and out of feeding relation with the driven roll, a control lever to shift said movable roll, an index element traversable lengthwise said rolls to measure and indicate the length of the strip fed, one of said rolls having a spiral formation, and means connected to said index element and adapted to engage said spiral formation to cause the traversing movement of said element, said control lever being arranged to effect said engagement when moved to bring said rolls into feeding relation.

34. In a strip serving machine, a support for a strip supply, a pair of feed rolls, a motor to drive one of said rolls, the other roll being movable into and out of feeding relation with the driven roll, a control lever to shift said movable roll, an index element traversible lengthwise said rolls to measure and indicate the length of strip fed, one of said rolls having a spiral formation, means connected to said index element and adapted to engage said spiral formation to cause the traversing movement of said element, said control lever being arranged to effect said engagement when moved to bring said rolls into feeding relation, a switch for said motor and operative connections between said switch and control lever.

35. In a strip serving machine, a support for a strip supply, a plurality of feed rolls between which the strip is adapted to be fed, a motor to drive one of said rolls, a spiral formation on another of said rolls, means normally holding said last mentioned roll out of feeding relation, a movable index element having a member adapted to be engaged with said spiral formation to effect indicating movement of said element in proportion to the length of strip fed, and means to bring said spirally formed roll into feeding relation and substantially simultaneously to effect engagement of said member and the spiral formation of said roll.

36. In mechanism for serving strips of adhesive tape or the like, a support for a tape supply, a plurality of rolls for feeding successive lengths of tape from said supply, means to rotate said rolls, indicating means, and means to move said indicating means proportionately to the length of tape fed, beginning always at the same indicating point and to return said indicating means after each indicating movement.

37. In mechanism for serving strips of adhesive tape or the like, a support for a tape supply, a plurality of rolls for feeding the tape from said supply, means to rotate said rolls, a movable index element having a normal or starting position, means for moving the same in proportion to the length of tape fed, and means whereby said index element is returned to its normal or starting position.

38. In mechanism for serving strips of adhesive tape or the like, a support for a tape supply, a plurality of rolls for feeding the tape from said supply, means to rotate said rolls, a movable index element, actuating means therefor operatively connected to said roll-rotating means to move said index element proportionately to the length of tape fed, and index element returning means.

39. In a strip serving machine, in combination with a support for a strip supply; strip feed rolls and means to drive one of them; a control lever for said feed rolls; a strip feed indicator; and operating connections between said indicator and said roll driving means, including an instrumentality carried by said control lever.

40. In a strip serving machine for labelling, package sealing and the like, a frame, a support for a strip supply, cooperating rolls between which the strip is to be fed from the supply, means for driving one of the rolls, a hand lever pivoted on the frame and having one end portion disposed in position for ready access to the operator, one of the rolls being rotatably mounted directly on the lever for movement thereby into or out of feeding relation to the other roll, and spring means tending to retain the lever in position wherein its roll is in non-feeding relation.

41. In combination, in mechanism for serving successive strips of adhesive tape, a feed roll for feeding tape from a supply, means to rotate said roll, a movable indicator to indicate successively the individual length of each strip as fed, a rotary member operatively associated with said roll rotating means and having a spiral formation for actuation of said indicator, and other means to return the indicator.

42. In a strip serving machine, a support for a strip supply, a plurality of rolls for feeding the strip, a motor to drive one of said rolls, a motor control switch, means operatively interposed between the motor and said rolls to start their feeding operation and selectively manually or automatically to stop the same, and mechanism operatively connecting an instrumentality of said interposed means with the motor control switch to stop the motor when said interposed means is actuated to stop the feeding either manually or automatically.

43. In a strip serving machine, a support for a strip supply, a pair of separable feed rolls, power-operated mechanism for actuating said feed rolls, a manual control lever for starting and stopping said actuating mechanism and to bring said feed rolls into feeding relation or to separate them, and automatic means to stop said actuating mechanism when the desired length of strip material has been fed.

44. In a strip serving machine, a support for a strip supply, a pair of separable feed rolls, power-operated mechanism for actuating said feed rolls, a manual control lever for starting and stopping said actuating mechanism and to bring said feed rolls into feeding relation or to separate them, and automatic means to stop said actuating mechanism when the desired length of strip material has been fed, said automatic means being regulatable to vary the length fed.

45. In a strip serving device, strip feeding means, strip moistening means, strip severing means, and a visual measuring device for measuring the length of strip fed out, consisting of a stationary measuring scale, a feed length indicator movable along said scale, means to move said strip feeding means and said indicator in synchrony so that the indicator measures the length of tape fed out and means to set said last mentioned means into operation.

46. In a strip serving device, strip feeding means, strip moistening means, strip severing means, and a visual measuring device for measuring the length of strip fed out, consisting of a stationary measuring scale, a feed length indicator movable along said scale, means to move said strip feeding means and said indicator in synchrony so that the indicator measures the length of tape fed out, means to set said last mentioned means into operation and means to return the indicator to normal position when the strip feeding means is released from the strip.

47. In a strip serving device, a releasable strip feeding means, strip moistening means, strip severing means, and a visual measuring device for measuring the length of strip fed out consisting of a stationary measuring scale having a feed length indicator movable along said scale, means to move said strip feeding means and said indicator in synchrony to measure the length of strip fed out, means to set said last mentioned means into operation, and means to return the indicator to normal position when the strip feeding means is released from the strip, said last mentioned means comprising a coil spring secured to the indicator.

48. In a strip serving machine of the type described, a supply of gummed tape, strip moistening means, strip severing means, strip feeding means including means to grasp the strip and feed it from the machine, a visual measuring device for measuring the length of strip fed out consisting of a stationary measuring scale in the form of a dial, a pointer movable on the dial in synchrony with the feeding of the tape and means to return the pointer to normal position when the feeding of the tape is stopped.

49. In a strip serving machine of the type described, a supply of gummed strip, moistening means, a strip severing means, strip feeding means including means to grasp the strip and feed it from the machine, a visual measuring device for measuring the length of strip fed out consisting of a stationary measuring scale in the form of a dial, a pointer movable on the dial in synchrony with the feeding of the tape and means to return the pointer to normal position when the feeding of the tape is stopped, said means comprising a spring secured to the machine and to the indicator.

50. In a gummed strip serving device, strip feeding means, strip moistening means, strip severing means, a visual measuring scale, and means to enable the operator at each operation of the machine to feed a strip of variable measured length over the entire measuring scale, including means to control the operation of said strip feeding means and an indicator movable along said scale in measured relation to the strip fed out for indicating to the operator the length of the strip fed.

51. In a strip serving device, strip feeding means, strip moistening means, strip severing means, a visual measuring scale and visual indicating means to enable the operator to feed a strip of variable measured length over the entire scale including an indicator and an operator control for said feeding means to control the starting and stopping of the tape feed, said scale and indicator having relative movement proportional to the length of strip fed, and at least one of said latter members being operatively associated with said strip feeding means.

52. In a gummed strip serving device, strip feeding means, strip moistening means, strip severing means, a visual measuring scale and means to enable the operator at each operation of the machine to feed a strip of variable measured length over the entire range of the scale including releasable means to grasp the strip to feed it from the machine, means to control the feeding movement of said strip feeding means and an indicator movable along said scale in measured relation to the strip fed out for indicating to the operator the length of the strip fed.

53. In a gummed strip serving device, strip feeding means, strip moistening means, strip severing means, a visual measuring scale and means to enable the operator at each operation of the machine to feed a strip of variable measured length over the entire range of the scale including plural means relatively movable toward and away from each other to grasp and release the strip to feed it from the machine, means to control the feeding movement of said strip feeding means and an indicator movable along said scale in measured relation to the strip fed out for indicating to the operator the length of strip fed.

EPHRAIM H. CHABOT.